United States Patent [19]
Stafford et al.

[11] Patent Number: 5,103,484
[45] Date of Patent: Apr. 7, 1992

[54] TARGET AIMPOINT LOCATION

[75] Inventors: Raymond J. P. Stafford; Enoch James, both of Hertfordshire, England

[73] Assignee: British Aerospace Public Limited Company, London, England

[21] Appl. No.: 700,307

[22] Filed: May 8, 1991

Related U.S. Application Data

[63] Continuation of Ser. No. 493,113, Mar. 15, 1990, abandoned.

[30] Foreign Application Priority Data

Mar. 15, 1989 [GB] United Kingdom ............... 8905926

[51] Int. Cl.$^5$ .................. G06K 9/00; H04N 5/225
[52] U.S. Cl. .................................. 382/1; 358/125; 364/516; 382/22; 382/55
[58] Field of Search ............... 382/1, 22, 55; 358/125, 358/126; 364/423, 513, 516; 342/55, 62, 66

[56] References Cited

U.S. PATENT DOCUMENTS

| | | | |
|---|---|---|---|
| 3,339,179 | 8/1967 | Shelton, Jr. et al. | 382/55 |
| 4,405,940 | 9/1983 | Woolfson et al. | 358/126 |
| 4,409,661 | 10/1983 | Romanski | 364/516 |
| 4,739,401 | 4/1988 | Sacks et al. | 358/105 |
| 4,796,187 | 1/1989 | North | 364/423 |

Primary Examiner—Leo H. Boudreau
Attorney, Agent, or Firm—Cushman, Darby & Cushman

[57] ABSTRACT

This invention relates to a method for analyzing a viewed scene containing a target. The scene is digitized forming a binary image in which the target is distinguished from the background. The image is then processed to form a contoured representation of the target, and a target skeleton. Finally a contoured skeleton is produced and the target aimpoint is determined.

6 Claims, 7 Drawing Sheets

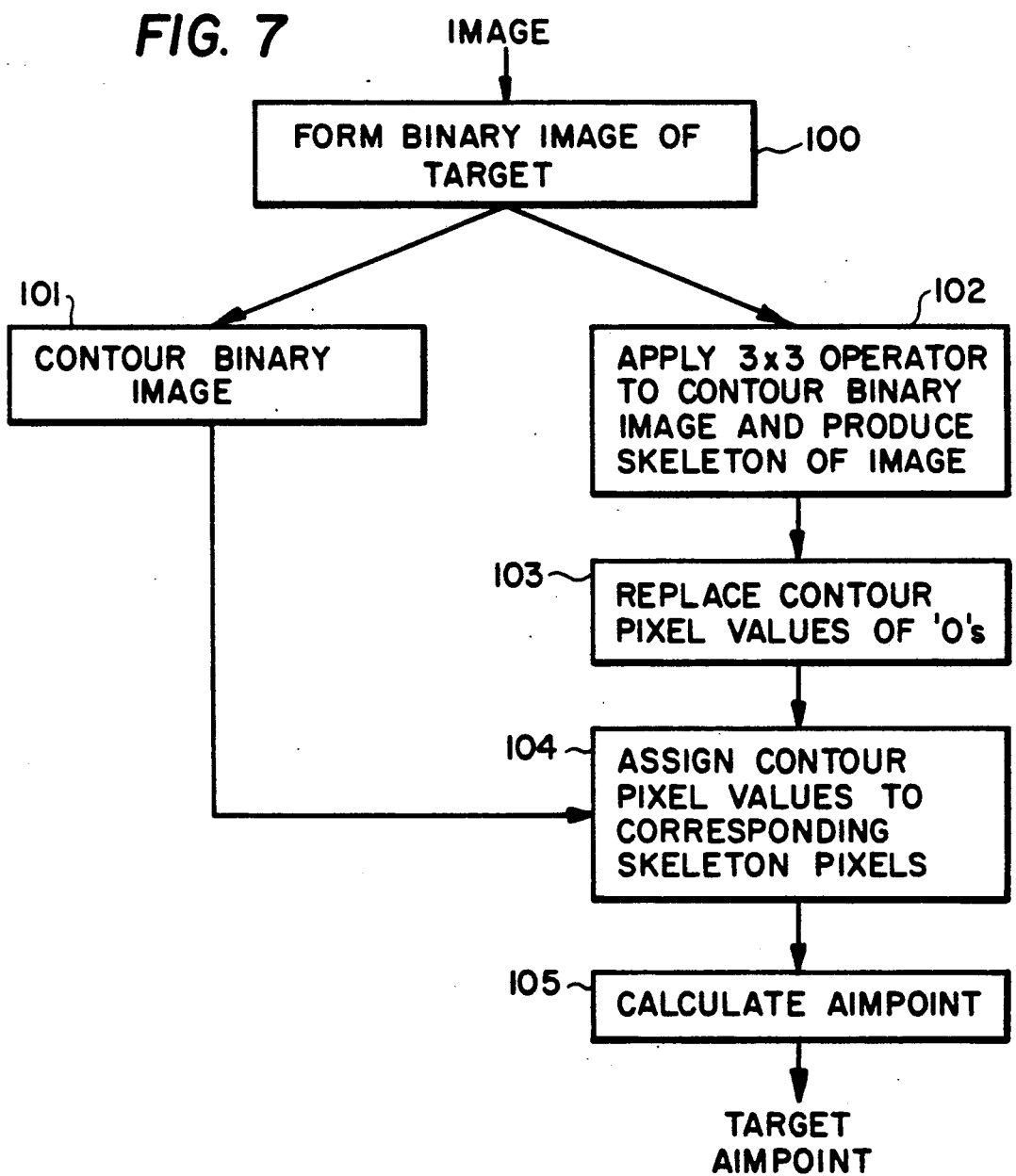

TARGET AIMPOINT LOCATION

This is a continuation of application Ser. No. 07/493,113, filed on Mar. 15, 1990, which was abandoned upon the filing hereof.

BACKGROUND OF THE INVENTION

This invention relates to a method of target aimpoint location, specifically, but not exclusively, to skeleton aimpoint location as may be implemented on parallel processing devices.

We have proposed a target tracking system in which digitized image of a target and its background are formed and then the image is processed to form a skeletal image of the target. The terms skeleton and skeletal image used herein mean an image comprising one or more linear elements forming a kind of "stick figure" representation of the original image. In the embodiment to be described, this "stick figure" representation comprises horizontal and vertical linear elements, one pixel across. These elements corresponding to features such as a central area and lobes of the target image. At least approximately, the linear elements are centered symmetrically between boundaries of the target at the two sides of the element. In this embodiment, the skeleton incorporates substantially all the information contained in the original image, i.e. the original image could be reproduced from the skeleton. This follows from an algorithm used to form the skeleton.

It may be desirable to assign a specific pixel within the target image, namely the center-of-gravity or centroid of the image, as an aimpoint for a weapon being guided onto the target.

SUMMARY OF THE INVENTION

One object of the present invention is to provide a quick and simple process for determining the aimpoint of a target using a parallel processing device.

According to one aspect of the present invention there is a method of determining a target aimpoint in a missile guidance tracking system, comprising the steps of:
  forming an image of a viewed scene;
  determining the presence of a target within the scene and forming a digitized binary image of the scene, the target being distinguished from the background of the scene;
  contouring the binary image to form a contoured image of the target and forming a separate skeleton image of the target using a recursive process, the skeleton being substantially one element thick;
  contouring the skeleton image to form a contoured skeleton; and,
  using a parallel processor to determine a centroid from the contour values and position of the skeleton elements and to determine the element closest to said centroid.

BRIEF DESCRIPTION OF THE DRAWING

Reference will now be made, by way of example, to the accompanying drawings, in which:

FIG. 7 shows a block diagram which illustrates the operation of the aimpoint location process.

DESCRIPTION OF THE PREFERRED EMBODIMENTS

In order to determine the aimpoint for a given target, a skeleton image has to be obtained from an image of a viewed scene containing the target. As shown in FIG. 7, step 100, a binary image is formed of the target by any convenient method known to those skilled in the art. This binary image is shown in FIG. 1 and comprises, an array of pixels each having a value of either '0' (corresponding to the background) or '1' (corresponding to the target).

Figure 1:
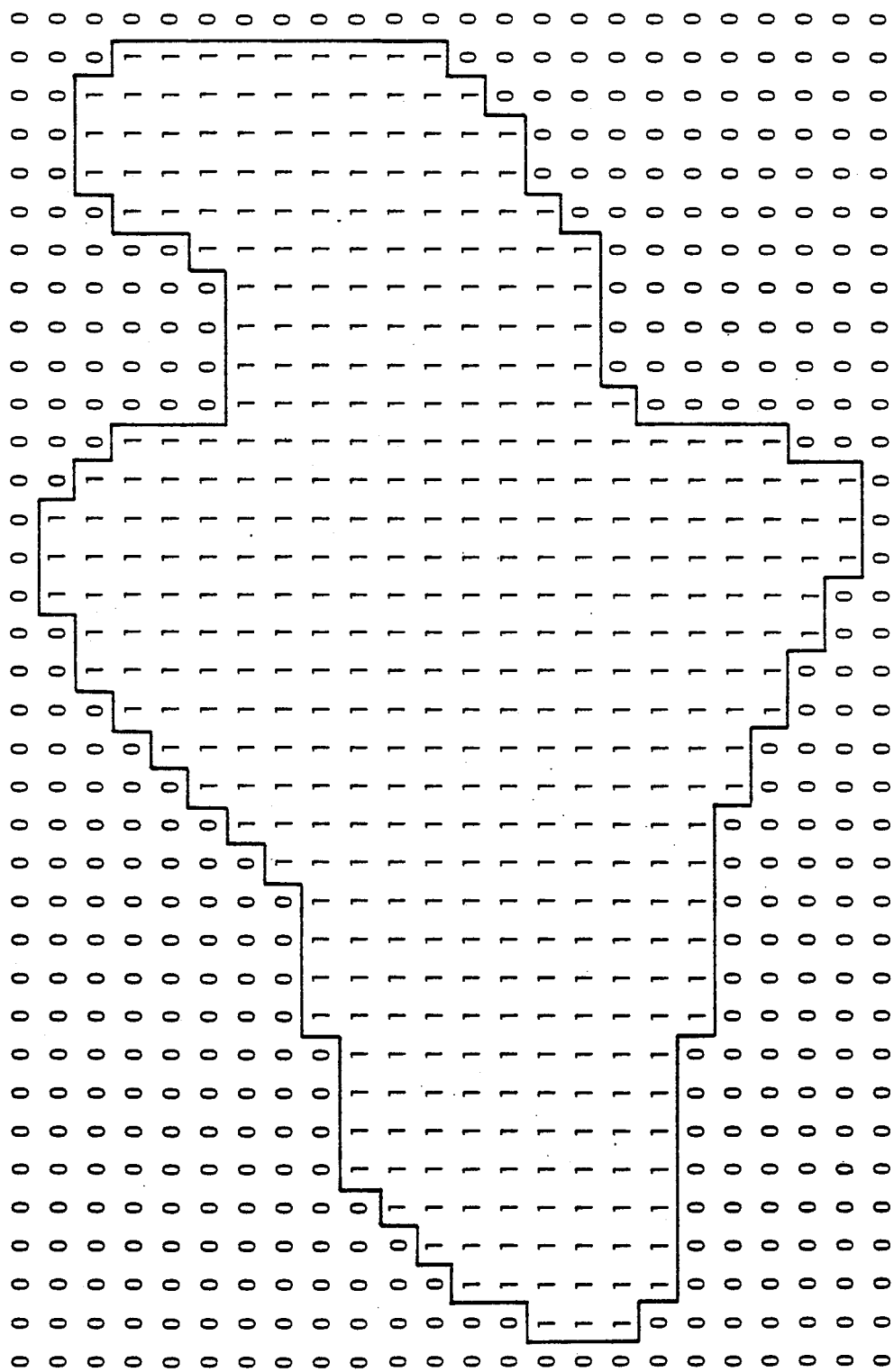
FIG. 1 illustrates a binary image of a target.
Figure 2:
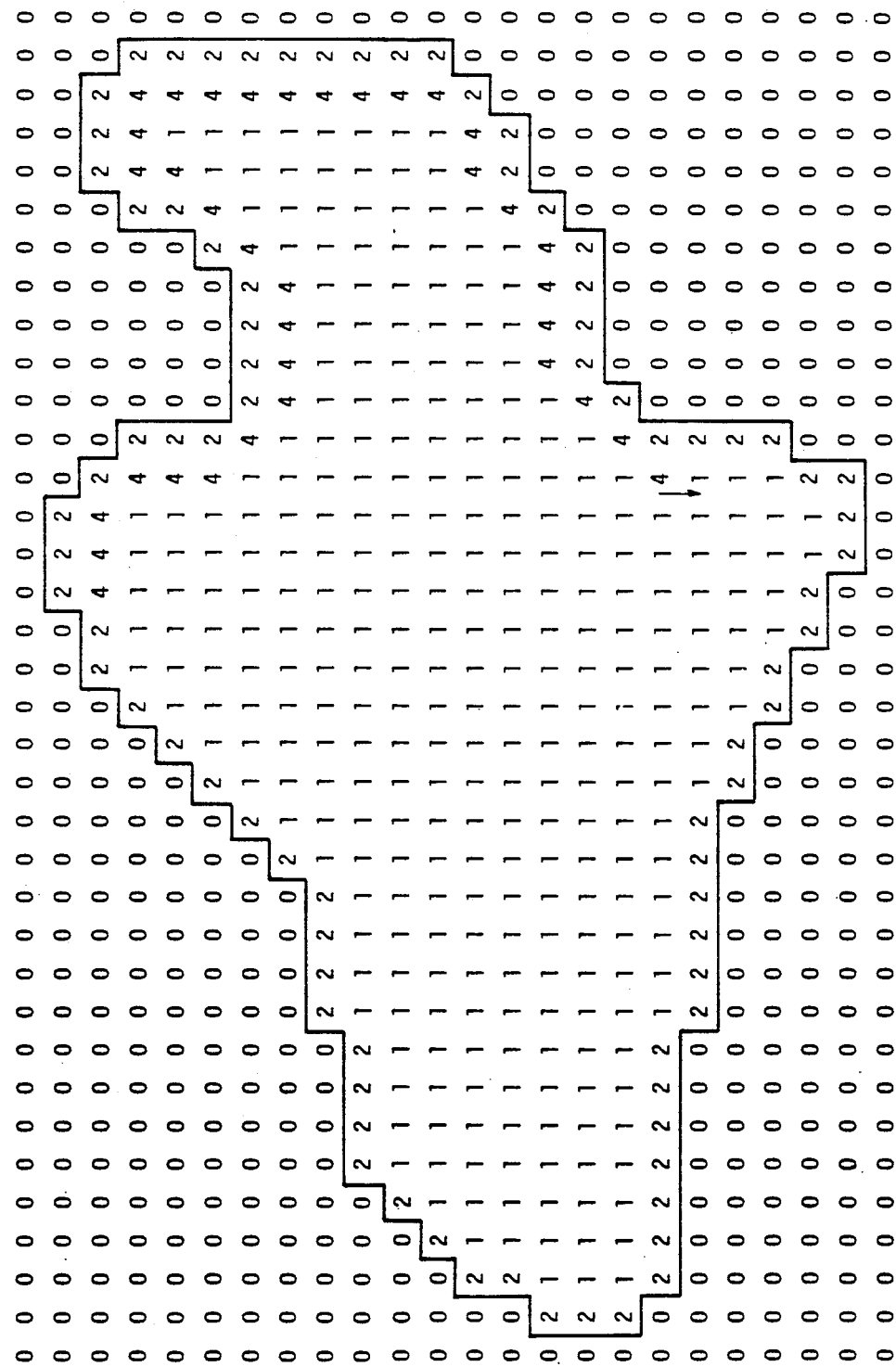
FIG. 2 shows how the FIG. 1 image is contoured.
Figure 3:
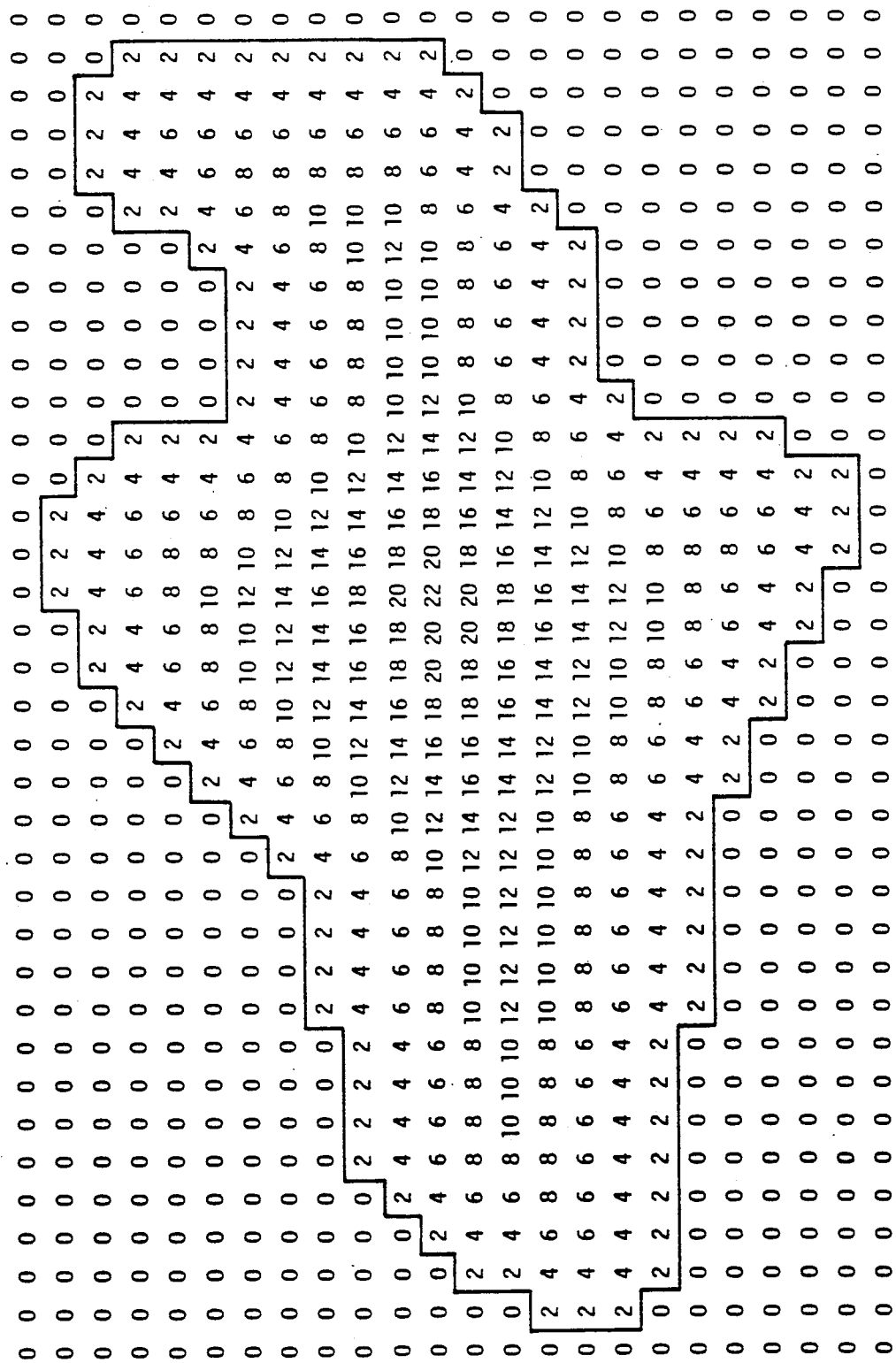
FIG. 3 illustrates a completed contoured image corresponding to FIG. 1.

The binary image of FIG. 1 is contoured, step 101, to provide a weighting for each pixel of the target area. In order to do this, the array is scanned, raster fashion, until the first '1' is located. This '1' is the starting point for the first contour, the boundary contour. Moving in a clockwise direction, all pixels on the boundary are assigned the contour value of '2', see FIG. 2. The array is scanned again as before until the first '1' is located, then as before all the pixels having a value of '1' inside the boundary contour (having a value '2') are assigned the value '4' when moving in a clockwise direction. This process is repeated, each of the inner contours being assigned a value two greater than its adjacent outer contour, until no more pixels having a value of '1' are located. The completed contoured image is illustrated in FIG. 3.

At the same time as the contoured image is being produced, another 'image' of the binary array is formed. Similar processing is used for the contoured image but certain 'test' conditions have to be satisfied at each pixel. As before, the first '1' is located by scanning the binary array raster fashion. Once this '1' is located a 3×3 operator is applied to it, step 102, the operator being:

| A | B | A |
|---|---|---|
| B | C | B |
| A | B | A |

The pixel C is the one to which the 'test' conditions are applied, and in this case is the first '1'. The other pixels of the operator respectively take the values of the eight neighbouring pixels unless any of those pixels does not have the value '1'. For each pixel which does not have the value '1', the relevant pixel of the operator is given the value '0'.

For example, for the first '1', we get:

| 0 | 0 | 0 |
|---|---|---|
| 0 | 1 | 1 |
| 1 | 1 | 1 |

The 'test' conditions are then applied:
→(i) more than two of the light possible (A+B) adjacent pixel pairs must be equal to 1 i.e. A+B=1 for at least three pairs of adjacent pixels;

→(ii) the sum of all A's and B's must be less than three.

If one or both these conditions are satisfied the pixel located at C remains unaltered. If neither condition is satisfied, then the value of the pixel at position C is given an increased value in the same way that values were assigned to the pixels when the contoured image was formed as described above. In the example above neither condition is satisfied. Therefore, that pixel takes a contour value of '2'. If later on in the contouring process, another pixel having the value of '1' is taken:

| 4 | 4 | 2 |
|---|---|---|
| 6 | 1 | 4 |
| 1 | 1 | 4 |

All the values of A and B are not '1' so the operator elements corresponding to the non-'1' image elements are made zero:

| 0 | 0 | 0 |
|---|---|---|
| 0 | 1 | 0 |
| 1 | 1 | 0 |

Figure 4:
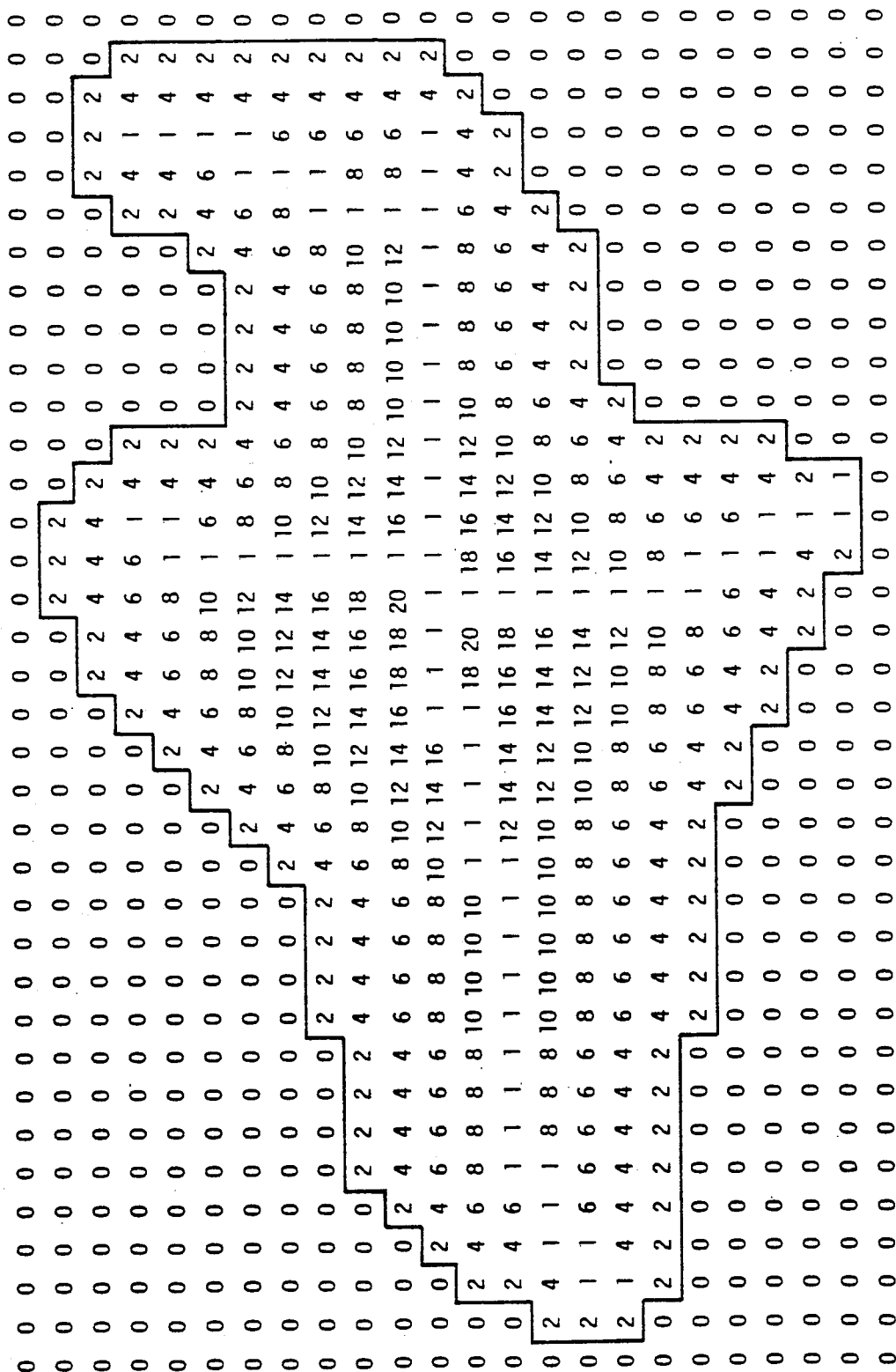
FIG. 4 shows an image equivalent to FIG. 3 but which satisfies the skeleton image conditions.

In this case, condition (ii) is satisfied and therefore the pixel C (in the center) remains unaltered i.e. keeps its value of '1'. Once this process is completed for each pixel the array as shown in FIG. 4 is obtained i.e. a contoured image except where the 'test' conditions are satisfied. From this array, in step 103 the skeleton image is formed where all the pixels not having a value of '1' are assigned the value of '0', this array is shown in FIG. 5.

Figure 5:
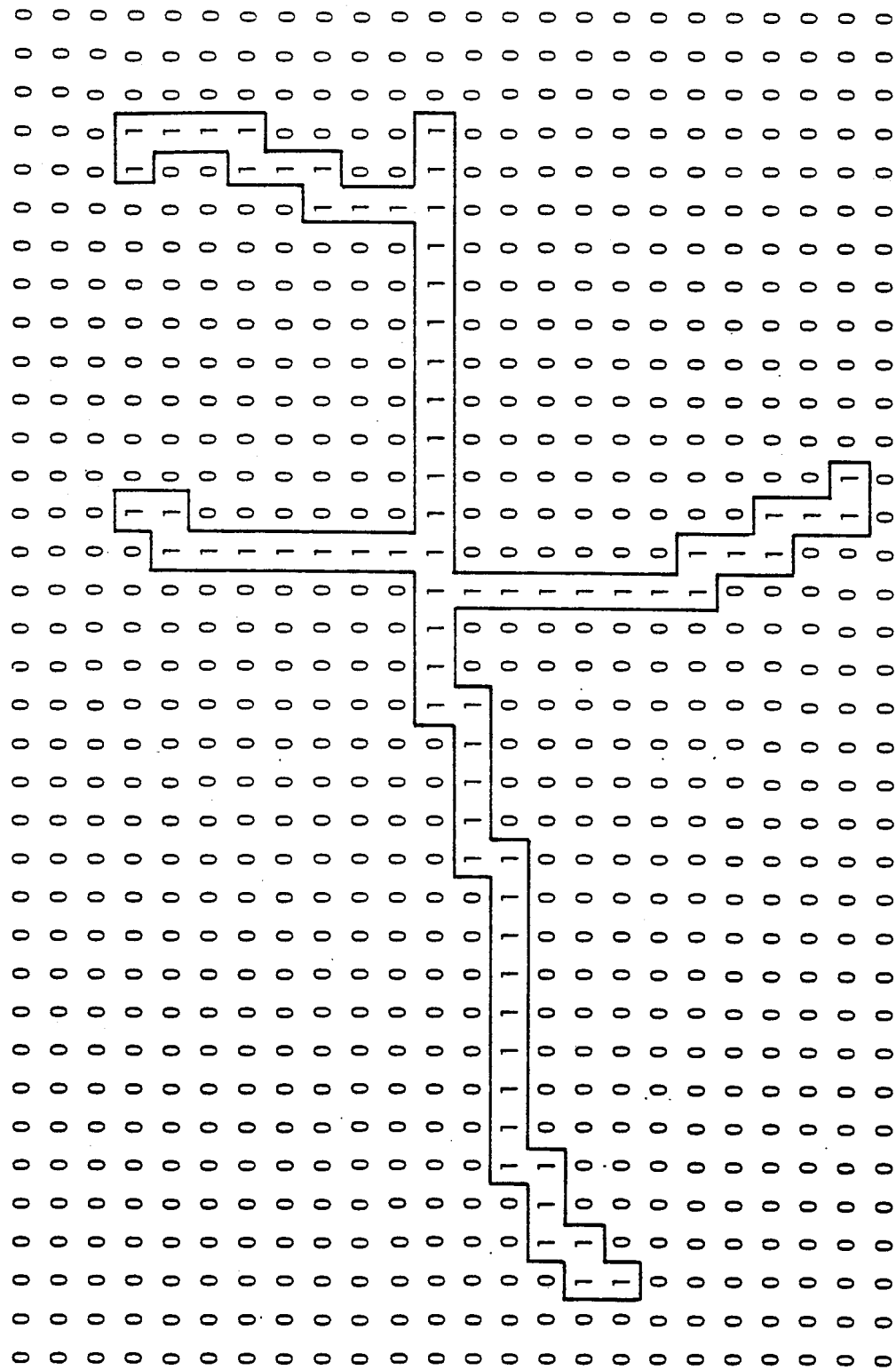
FIG. 5 illustrates the skeleton image of the FIG. 1 target.
Figure 6A:
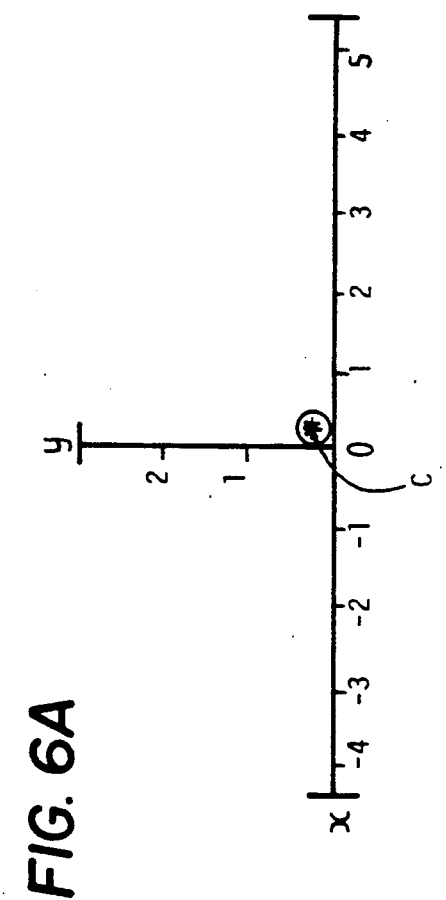
FIGS. 6A and 6B show part of another skeleton image in which contour values have been assigned to the pixels of the skeleton.
Figure 6B:
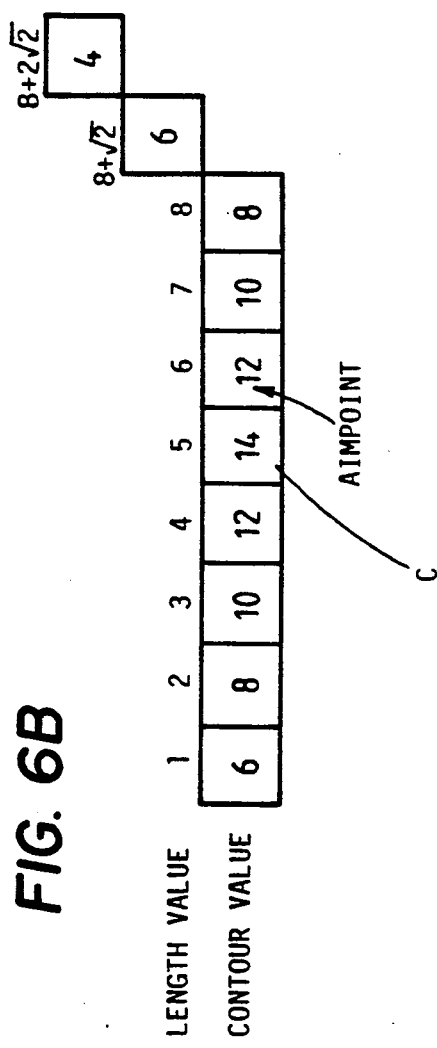

The array of FIG. 5 may be contoured by any appropriate method to produce an array similar to that of FIG. 6. For example, in step 104 the skeleton pixels may simply be assigned the contour values already determined for the corresponding pixels of the previously formed contour image, i.e. the skeleton pixels of FIG. 5 take the value of the correspondingly located pixels of FIG. 3, thus the information from the contoured image (FIG. 3) is also used to produce a contoured skeleton (FIG. 5).

Referring to FIG. 6, in order to determine a suitable aimpoint, step 105, location or actual centroid of the target, an xy axes system is centered on one of the pixels, preferably the one with the highest skeletal contour value, i.e. the skeletal centroid. The co-ordinates $\bar{x}, \bar{y}$ of the actual centroid are then determined from:

$$\bar{x} = \Sigma\Sigma x C(x,y)/\Sigma\Sigma C(x,y)$$

and $$\bar{y} = \Sigma\Sigma y C(x,y)/\Sigma\Sigma C(x,y)$$

where x and y are values on the axes system and C(x,y) are the contour values found at the skeletal pixel locations. From $\bar{x}$ and $\bar{y}$ the distance D of the actual centroid (denoted *) from the skeletal centroid may be determined thus:

$$D = \sqrt{\bar{x}^2 + \bar{y}^2}$$

Considering the skeleton of FIG. 6. The centroid C is marked and has a contour value of 14. The x,y axis is centered on this point. $\Sigma\Sigma C(x,y)$, $\Sigma\Sigma xC(x,y)$ and $\Sigma\Sigma yC(x,y)$ are determined as shown.

$$\begin{aligned}
\Sigma\Sigma C(x,y) &= 8 + 8 + 10 + 12 + 14 + 12 + 10 + 8 + 6 + 4 \\
&= 90
\end{aligned}$$

$$\begin{aligned}
\Sigma\Sigma x C(x,y) &= (-4 \times 6) + (-3 \times 8) + (-2 \times 10) + \\
&\quad (1 \times 12) + (0 \times 14) + (1 \times 12) + (2 \times 10) + \\
&\quad (3 \times 8) + (4 \times 6) + (4 \times 4) \\
&= -24 + -24 - 20 - 12 + 12 + 20 + 24 + \\
&\quad 24 + 16 \\
&= 16
\end{aligned}$$

$$\begin{aligned}
\Sigma\Sigma y C(x,y) &= (0 \times 6) + (0 \times 8) + (0 \times 10) + (0 \times 12) + \\
&\quad (0 \times 14) + (0 \times 12) + (0 \times 10) + \\
&\quad (0 \times 8) + (1 \times 6) + (2 \times 4) \\
&= 6 + 8 \\
&= 14
\end{aligned}$$

$$\begin{aligned}
\bar{x} &= \Sigma\Sigma x C(x,y)/\Sigma\Sigma C(x,y) \\
&= \frac{16}{80} = 0.1778
\end{aligned}$$

$$\begin{aligned}
\bar{y} &= \Sigma y C(x,y)/\Sigma\Sigma C(x,y) \\
&= \frac{14}{90} = 0.1555
\end{aligned}$$

The distance D from the actual centroid to the skeletal centroid is also determined:

$$D = \sqrt{\bar{x}^2 + \bar{y}^2}$$

$$D = \sqrt{0.1778^2 + 0.1555^2}$$

$$D = \sqrt{0.0316 + 0.0242}$$

$$D = 0.236$$

If necessary this distance D may be determined for each skeletal pixel so that the pixel closest to the centroid can be determined and this pixel be used as an indication of aimpoint location.

Referring to FIG. 7, a block diagram is shown which illustrates the above-described steps to determine the aimpoint location.

We claim:

1. A method of determining a target aimpoint in a missile guidance tracking system, the method comprising the steps of:
   (a) forming an image of a viewed scene;
   (b) determining the presence of a target in the image;
   (c) digitizing said image to form a binary image; said binary image comprising a two-dimensional array of pixels distinguishing a target image from other elements of the image;
   (d) forming a contoured image of the target image from said binary image by assigning weights to said pixels based on a location of a pixel relative to edges of the target image;
   (e) forming a skeleton image of the target image from said binary image by selecting pixels based on a location of a pixel relative to said edges of the target image;
   (f) forming a contoured skeleton image by assigning the assigned weights of pixels in said contoured image to the corresponding pixels in said skeleton image; and (g) processing the assigned weights of the pixels in said contoured skeleton image to determine the target aimpoint.

2. The method of claim 1, wherein in said target aimpoint is determined as the centroid of said contoured skeleton image.

3. A method according to claim 2, wherein the centroid is determined based on a chosen pixel of said contoured skeleton image, the weights of the respective pixels of said contoured skeleton image, and a distance of each pixel in said contoured skeleton image from said chosen pixel.

4. The method of claim 3, wherein said chosen pixel is the pixel in said contoured skeleton image with the highest pixel weight.

5. A method according to claim 1, wherein said contoured image is formed by assigning each pixel in the target image a value according to the distance of a pixel from said edges of the target image.

6. A method according to claim 1, wherein said skeleton image is formed by applying a set of predetermined test conditions to said binary image.

* * * * *

UNITED STATES PATENT AND TRADEMARK OFFICE
CERTIFICATE OF CORRECTION

PATENT NO. : 5,103,484
DATED : April 7, 1992
INVENTOR(S) : STAFFORD, et al.

It is certified that error appears in the above-identified patent and that said Letters Patent is hereby corrected as shown below:

Col. 2, line 66, change "light" to -- eight --

Col. 3, second line after line 50, correct to read --
$\bar{x} = \Sigma\Sigma x C(x,y) \Sigma\Sigma C(x,y)$ --

Col. 4, line 1, correct to read --
$\Sigma\Sigma C(x,y) = 6 + 8 + 10 + 12 + 14 + 12 + 10 + 8 + 6 + 4$ Col. 4, first line after line 20, correct to read --
$= \frac{16}{90} = 0.1778$ --

Signed and Sealed this

Thirty-first Day of August, 1993

Attest:

BRUCE LEHMAN

*Attesting Officer*     *Commissioner of Patents and Trademarks*